United States Patent
Glacki et al.

(10) Patent No.: US 12,391,595 B2
(45) Date of Patent: Aug. 19, 2025

(54) APPARATUS AND METHOD FOR PRODUCING GLASS RIBBONS

(71) Applicant: SCHOTT AG, Mainz (DE)

(72) Inventors: Alexander Glacki, Mainz (DE); Christian Breitbach, Darmstadt (DE); Holger Hunnius, Mainz (DE); Ulrich Lange, Mainz (DE); Wolfgang Munch, Budenheim (DE); Gregor Rösel, Ginsheim-Gustavsburg (DE); Volker Seibert, Hochheim (DE); Holger Wegener, Alfeld (DE)

(73) Assignee: SCHOTT AG, Mainz (DE)

( * ) Notice: Subject to any disclaimer, the term of this patent is extended or adjusted under 35 U.S.C. 154(b) by 99 days.

(21) Appl. No.: 16/938,074

(22) Filed: Jul. 24, 2020

(65) Prior Publication Data

US 2021/0024400 A1  Jan. 28, 2021

(30) Foreign Application Priority Data

Jul. 24, 2019  (DE) .................... 10 2019 120 065.2

(51) Int. Cl.
C03B 17/06  (2006.01)

(52) U.S. Cl.
CPC .......... *C03B 17/062* (2013.01); *C03B 17/068* (2013.01)

(58) Field of Classification Search
None
See application file for complete search history.

(56) References Cited

U.S. PATENT DOCUMENTS

| 1,565,319 | A | 12/1925 | Fowle |
| 1,829,639 | A | 10/1931 | Ferngren |
| 1,853,842 | A | 4/1932 | Bates |
| 2,179,224 | A | 11/1939 | Soubier |
| 3,080,737 | A | 3/1963 | Gell |

(Continued)

FOREIGN PATENT DOCUMENTS

| CN | 103663927 | 3/2014 |
| CN | 104302584 | 1/2015 |

(Continued)

OTHER PUBLICATIONS

Li, "Introduction to Flat Panel Display Glass Technology", Edited by Li Qing.—Shijiazhuang: Hebei Science and Technology Press, 2017. 6 ISBN 978-7-5375-8882-9, with English translation.

(Continued)

*Primary Examiner* — Queenie S Dehghan
(74) *Attorney, Agent, or Firm* — Ruggiero McAllister & McMahon LLC

(57) ABSTRACT

An apparatus is provided for drawing glass ribbons from molten glass. The apparatus includes a drawing tank for holding the molten glass and a guiding body. The tank has a lower nozzle opening through which the molten glass can exit downwards. The nozzle opening has two nozzle slots defined between the guiding body and edges of the nozzle opening. The guiding body protrudes downward out of the nozzle opening. The guiding body is supported so as to be spaced apart from the edges with the guiding body suspended in a self-supporting manner at least along a central section of the nozzle opening.

5 Claims, 6 Drawing Sheets

(56) References Cited

U.S. PATENT DOCUMENTS

| | | | |
|---|---|---|---|
| 3,506,429 | A | 4/1970 | Overman |
| 3,607,182 | A | 9/1971 | Leibowitz |
| 3,682,609 | A | 8/1972 | Dockerty |
| 4,027,091 | A | 5/1977 | Pieper |
| 4,247,733 | A | 1/1981 | Stevenson |
| 4,268,296 | A | 5/1981 | Pfaender |
| 4,389,725 | A | 6/1983 | Barkhau |
| 4,525,194 | A | 6/1985 | Rudoi |
| 7,013,677 | B2 | 3/2006 | Singer |
| 8,042,361 | B2 | 10/2011 | Pitbladdo |
| 8,490,432 | B2 | 7/2013 | Berkey |
| 9,233,869 | B2 | 1/2016 | Pitbladdo |
| 9,242,887 | B2 | 1/2016 | Gromann |
| 2001/0038929 | A1 | 11/2001 | Uhlik |
| 2004/0065115 | A1 | 4/2004 | Mueller |
| 2004/0067369 | A1 | 4/2004 | Ott |
| 2004/0154336 | A1 | 8/2004 | Pitbladdo |
| 2006/0144089 | A1 | 7/2006 | Eichholz |
| 2007/0064763 | A1 | 3/2007 | Hunnius |
| 2007/0140311 | A1 | 6/2007 | House |
| 2007/0271963 | A1 | 11/2007 | Lange |
| 2008/0184741 | A1 | 8/2008 | Mueller |
| 2008/0282736 | A1 | 11/2008 | Filippov |
| 2010/0126224 | A1 | 5/2010 | Lineman |
| 2011/0317329 | A1 | 12/2011 | Letz |
| 2012/0318020 | A1 | 12/2012 | Delia |
| 2013/0133367 | A1* | 5/2013 | Abramov .............. C03B 21/00 65/53 |
| 2013/0305784 | A1 | 11/2013 | Gromann |
| 2014/0319405 | A1 | 10/2014 | Kijima |
| 2014/0352359 | A1 | 12/2014 | Yu |
| 2017/0057874 | A1 | 3/2017 | Miao |
| 2018/0334405 | A1 | 11/2018 | Buellesfeld |
| 2019/0144324 | A1 | 5/2019 | De Angelis |
| 2019/0152825 | A1 | 5/2019 | Fournel |
| 2019/0161375 | A1 | 5/2019 | Okamoto |
| 2021/0269347 | A1 | 9/2021 | Zimmer |

FOREIGN PATENT DOCUMENTS

| | | |
|---|---|---|
| CN | 104379516 | 2/2015 |
| CN | 106132905 | 11/2016 |
| CN | 107759054 | 3/2018 |
| CN | 108947218 | 12/2018 |
| DE | 506472 | 9/1930 |
| DE | 1596484 | 10/1971 |
| DE | 4440702 | 7/1996 |
| DE | 19809878 | 9/1999 |
| DE | 19948634 | 4/2001 |
| DE | 19964043 | 7/2001 |
| DE | 10064977 | 10/2002 |
| DE | 102004007560 | 9/2005 |
| DE | 20321430 | 4/2007 |
| GB | 292448 | 6/1928 |
| JP | H02217327 | 8/1990 |
| JP | 2001318191 | 11/2001 |
| JP | 2007091503 | 4/2007 |
| JP | 2011102207 | 5/2011 |
| JP | 2012509845 | 4/2012 |
| JP | 2013035724 | 2/2013 |
| JP | 6036192 | 11/2016 |
| JP | 2019011237 | 1/2019 |
| JP | 6500679 | 4/2019 |
| JP | 2019514831 | 6/2019 |
| KR | 20160023631 | 3/2016 |
| WO | 2005035453 | 4/2005 |
| WO | 2005110934 | 11/2005 |
| WO | WO-2008140682 A1 * | 11/2008 ........... C03B 17/064 |
| WO | 2011090893 | 7/2011 |
| WO | 2013054432 | 4/2013 |
| WO | 2013082360 | 6/2013 |
| WO | 2015026615 | 2/2015 |
| WO | 2016158435 | 10/2016 |
| WO | 2017087183 | 5/2017 |
| WO | 2017087738 | 5/2017 |
| WO | 2018079810 | 5/2018 |
| WO | 2018098119 | 5/2018 |
| WO | 2020104497 | 5/2020 |

OTHER PUBLICATIONS

Ralston, "Revealing the relationship between grain size and corrosion rate of metals", Aug. 24, 2010, Scripta Materialia 63, 1201-1204 (Year: 2010).

Gölitzer, "Fine-grain stabilized platinum materials for high-temperature applications", The Wayback Machine—https://web.archive.oi'g/web/20I fi080519410 1/http://pcm.uinicoie.coin:80/en/ . . . , Sep. 2001, with English translation.

"Platin", Wikipedia, Jun. 28, 2019, with English translation, 24 pages.

* cited by examiner

APPARATUS AND METHOD FOR PRODUCING GLASS RIBBONS

CROSS REFERENCE TO RELATED APPLICATIONS

This application claims benefit under 35 USC § 119 of German Application 10 2019 120 065.2 filed Jul. 24, 2019, the entire contents of which are incorporated herein by reference.

BACKGROUND

1. Field of the Invention

The invention generally relates to glass manufacturing. More particularly, the invention relates to the making of glass ribbons in a down-draw process.

2. Description of Related Art

Various drawing processes are known for making glass ribbons. Besides the float process, vertical drawing processes such as the overflow fusion process and the down-draw process are employed as well. The float process is in particular used for large widths of the glass sheets to be manufactured. A drawback of this technique is that the two sides of the glass principally differ in their properties, since one side of the glass ribbon is exposed, while the other side is in contact with the tin bath. Among other things, this leads to tin contamination of the side of the glass bearing on the tin bath.

The down-draw process, by contrast, can be used to produce glass ribbons with completely similar surfaces. Moreover, the down-draw process is particularly suitable for producing very thin glasses and wide glass ribbons.

In the down-draw process, a drawing tank ensures an even glass distribution down to a nozzle slot through which the glass exits at the hot forming temperature. In the case of down-drawing without a guiding body (also known as a blade body of the inner nozzle), the produced articles exhibit poorer surface quality, especially in terms of a fine ripple, also known as waviness, due to the short dwell time of the glass in the drawing onion zone. Unevenness that arises on the tear-off edge of the glass at the nozzle exit cannot be effectively relieved in this way. Furthermore in this case, the process requires a slot shape of the nozzle, which has to be adapted to the thickness to be produced in each case. Upon a change in thickness formats to be produced, this causes downtime due to setup times and increased material requirements.

The use of a guiding body brings an improvement. More generally, however, the guiding body may influence the flow of the molten glass in the drawing tank, so that thickness variations and glass defects such as in particular streaks may be caused.

SUMMARY

The invention is therefore based on the object of specifying an arrangement and a corresponding method for drawing glass ribbons, which is improved with respect to shape accuracy and dimensional consistency of the glass ribbon and the avoidance of glass defects. Accordingly, the invention provides an apparatus for drawing glass ribbons from a molten glass, the apparatus comprising a drawing tank for holding a molten glass, which has a lower nozzle opening of a preferably gap- or slot-like shape, through which the molten glass can exit downwards. The apparatus furthermore comprises a guiding body which protrudes downward out of the nozzle opening of the drawing tank. The guiding body is supported so as to be spaced apart from the edges of the nozzle opening so that two nozzle slots are defined between the guiding body and the edges of the nozzle opening. At the same time the guiding body is supported at its two opposed ends so as to be suspended in a self-supporting manner along the nozzle opening.

In the case of a self-supporting suspension, in particular for large glass ribbon widths, portions of the apparatus may undergo creep deformation over time due to the mechanical load during the drawing process at high temperatures, which has an impact on the geometry of the nozzle and of the guiding body. This problem occurs in particular when glasses with high softening temperatures are to be processed. For this purpose, it is contemplated according to a preferred embodiment that the guiding body comprises fine grain stabilized metal as a carrier material.

Because the guiding body extends in a self-supporting manner along the nozzle slot, that is to say that supporting means or struts for the guiding body are avoided inside the drawing tank that is filled with the molten glass, the flow of the molten glass is not affected by such structures. In this way, a very even glass flow is achieved, and a correspondingly homogeneous thickness of the glass ribbon being drawn. However, due to the intrinsic weight of the guiding body on the one hand and the drawing off of the glass ribbon on the other hand, bending moments act on the guiding body because of the suspension at the ends, which may cause a creep deformation of the guiding body. This creep deformation is prevented with the fine grain stabilized metal in the supporting structure of the guiding body.

The arrangement described above allows to perform a method for producing a glass ribbon, in which a molten glass is fed to a drawing tank, the drawing tank having a lower nozzle opening for the molten glass to exit, wherein a guiding body is arranged in the nozzle opening and protrudes downward out of the nozzle opening of the drawing tank, the guiding body being supported so as to be spaced apart from the edges of the nozzle opening so that two nozzle slots are defined between the guiding body and the edges of the nozzle opening, wherein the guiding body is suspended at two opposed lateral ends thereof so as to extend in a self-supporting manner along the nozzle opening, i.e. along the longitudinal extension thereof, and wherein the molten glass emerges from the nozzle slots from the drawing tank in two substreams and runs along the portion of the guiding body protruding out of the nozzle opening and the substreams combine at the lower end of the guiding body to form a drawing onion from which the glass ribbon is drawn off, and wherein a tensile force exerted on the guiding body by the drawing off of the glass ribbon is absorbed by the suspension of the guiding body at the lateral ends thereof.

The down-draw process involving a guiding body allows for a higher glass throughput compared to the drawing of glass ribbons without a guiding body, due to the larger drawing tank opening and a better surface quality on the product. This is caused by the extended dwell time on the guiding body after emerging from the nozzle. Another advantage is that in this case it is possible to operate at an increased temperature in the nozzle area, because the forming viscosities of $10^{3.5}$ dPa·s to $10^{4.5}$ dPa·s do not need to be achieved in the nozzle slot but only at the lower edge of the guiding body. In the case of crystallization-sensitive glasses and glass ceramics, this is very advantageous and leads to increased yields. The advantage of the down-draw process, whether with or without a guiding body, compared to the overflow fusion process with overflow trough on ceramic is that there will be no or only a reduced center streak (which is caused by the ceramic of the trough). Glass composition homogeneity along the thickness is therefore very high. Also, the guiding body does not cause any inhomogeneities in the glass either, due to the self-supporting suspension presently suggested. Furthermore, the process offers a high degree of flexibility, because after stopping the process the tools can be exchanged and can later be reused. In addition, the thickness of the beads is reduced comparatively, which, inter alia, makes it easier to deflect the ribbon to the horizontal downstream of the lehr exit for further processing, and in particular also increases both efficiency and yield.

According to one embodiment, at least one of the following noble metal alloys are used in a fine grain stabilized form for the guiding body and optionally also for the drawing tank, in particular in the vicinity of the nozzle opening: $Pt_xRh_yAu_z$ with $0\% \leq x \leq 100\%$, $0\% \leq y \leq 20\%$, $0\% \leq z \leq 20\%$, $Pt_u$-$Ir_v$ alloys with $0\% \leq u \leq 100\%$, $0\% \leq v \leq 20\%$.

Without fine grain stabilization, these alloys are not completely stable against creep processes any more at high temperatures of >1100° C., particularly critical >1250° C., which leads to increasing deformation of the tools over time. However, the arrangement described herein generally allows to draw glass ribbons from glasses at forming temperatures above 1100° C., without being limited to the specific alloys mentioned above. Within the present disclosure, forming temperature refers to a temperature at which the glass has a viscosity of $10^4$ dPa·s.

In the down-draw process with blade body or guiding body, the drawing tank, the slot nozzle, and the guiding body form a system that influences the thickness distribution (distribution longitudinally and transversely) of the viscous glass. Good long-term stability of this system is very advantageous here. The presently described assembly allows to use the down-draw method with guiding body even with high drawing forces. According to one embodiment it is contemplated that the glass ribbon is drawn off from the nozzle or the drawing tank with a tensile force of greater than 100 N per 1000 mm glass ribbon width. This is even possible for glasses exhibiting a hot forming temperature of more than 1200° C.

When blades or guiding bodies with sandwich structure and fine grain stabilized precious metal components in component areas subjected to tensile stress were employed at hot forming temperatures of 1450° C., no quality-critical deformations were observed even after more than two weeks of production.

Metals that are suitable for the fine grain stabilized carrier material in particular include platinum and platinum alloys, especially Pt, PtRh, PtAu, PtRhAu, PtIr, preferably with the percentages mentioned above. The carrier material can be produced by melt metallurgical or powder metallurgical processes. Nanoparticles are preferably used for fine grain stabilization. $ZrO_2$ is well suited as a material for the fine-grained particles. The fine-grained particles can be added in particular when the metal is melted or when the alloy is melted in combination so as to be distributed in the melt. Generally it is also possible for the fine grain stabilized components to be produced by powder metallurgy. For this purpose, metal particles and the fine-grained particles are mixed and the mixture is sintered together.

A guiding body entirely made of fine grain stabilized metal is particularly stable.

According to a further embodiment, the guiding body may consists of a plurality of pieces, in which case at least one of the pieces or components is made of fine grain stabilized metal. In this case, the guiding body in particular is a sandwich structure made of fine grain stabilized metal and a further material. The further material may be a metal or a non-metallic high-temperature resistant material. It is generally also possible to cover ceramics with stabilized or partially stabilized alloys in order to increase their creep resistance and to prevent corrosion of the ceramics. According to one embodiment, the guiding body therefore comprises at least one ceramic element which is coated with the fine grain stabilized metal.

The embodiment variant of a guiding body entirely made of fine grain stabilized metal has the advantage of enhanced stability. Drawbacks are increased material costs and reduced weldability due to floating effects of the stabilizing materials and increased brittleness.

The further variant comprising a sandwich structure of the guiding body or a combination with not fine grain stabilized metal is preferable with regard to material costs and weldability, but the service life expectations are somewhat lower. Suppliers of such stabilized materials are, e.g., Umicore, Furuya, Heraeus, Tanaka, each with their own versions of these materials (Umicore e.g. PtRh10 FKS Rigilit, PtRh10 FKS Saeculit; Heraeus e.g. PtRh10 DPH or DPH-A, etc.). Highly creep-resistant precious metals such as pure iridium are less suitable because they are not oxidation resistant.

BRIEF DESCRIPTION OF THE FIGURES

The invention will now be explained in more detail with reference to the accompanying figures, wherein.

DETAILED DESCRIPTION

Figure 1:
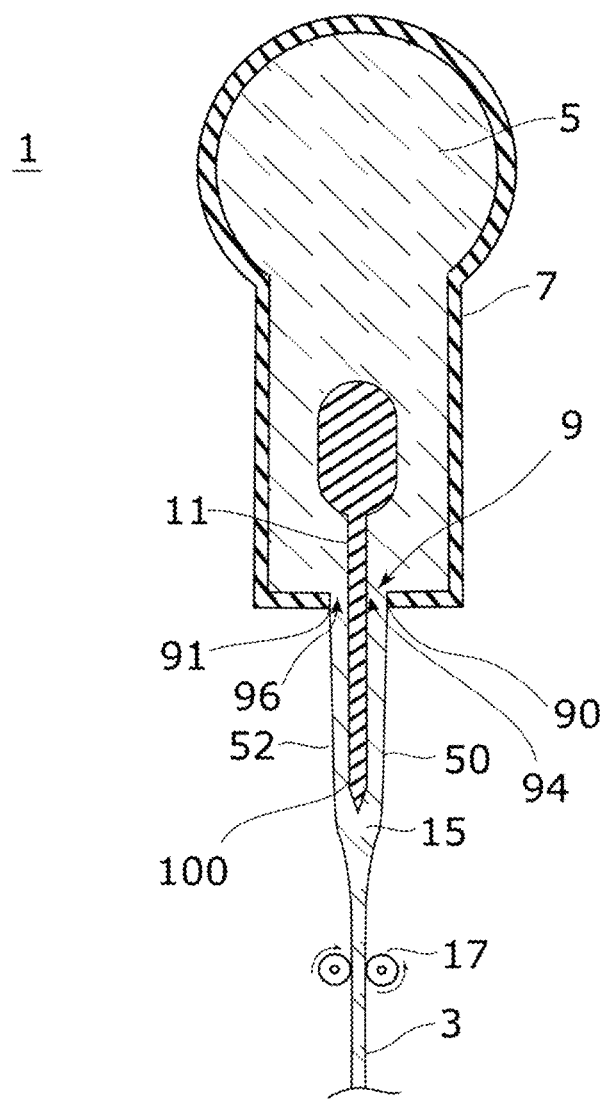
FIG. 1 is a cross-sectional view through a drawing tank with a guiding body.

FIG. 1 shows portions of an apparatus 1 for drawing glass ribbons 3 from a molten glass 5. The apparatus 1 comprises a drawing tank 7 for holding molten glass 5, which has a nozzle opening 9 at its lower end, through which the molten glass 5 can exit downwards. A guiding body 11 is arranged inside the drawing tank 7 and protrudes downward out of the nozzle opening 9 of the drawing tank 7. As the guiding body 11 extends through the nozzle opening, it subdivides it into two nozzle slots 94, 96. The molten glass 5 emerges from those nozzle slots 94, 96 in two substreams 50, 52 which run down along the guiding body 11 and combine at the lower end of the portion 100 of guiding body 11, which protrudes from nozzle opening 9. This region in which the two substreams unite and from which the glass ribbon is formed by being drawn off is referred to as a drawing onion 15.

While being drawn off, the thickness of the glass ribbon 3 reduces by the drawing of the glass. At the same time, the glass becomes colder with growing distance from the nozzle opening 9, and accordingly becomes more viscous until it solidifies.

It is generally preferred for the guiding body 11 to protrude from the nozzle opening 9 by at least 30 mm, preferably at least 80 mm. This ensures good distribution of the molten glass on the guiding body 11, so that variations in thickness of the glass ribbon are prevented.

Without being limited to the example shown, it may be favorable if the guiding body 11 comprises a resistance body 101 which is arranged inside the drawing tank 7 and consists of an thickened portion at the upper end of the guiding body 11, narrowing the flow cross section for the molten glass 5 compared to the downward adjoining portion of the guiding body 11. This lower portion of the guiding body 11 may be referred to as a fin or blade 103. Thus, more generally, it is suggested according to one embodiment of the invention that the guiding body 11 comprises a resistance body 101 and a blade 103 arranged below the resistance body 101, and that the resistance body 101 has a greater width than the blade 103 in order to restrict the flow cross section in the drawing tank 7.

Preferably, the distance from the nozzle opening 9 to the lower edge of the flow resistance or resistance body 101 will usually be at least 3 mm, preferably at least 8 mm.

In order to draw off the glass ribbon 3, a drawing device 17 may be provided, which may comprise one or more pairs of driven rollers, for example. The drawing causes a tensile force to be exerted on the glass ribbon 3, which typically acts at least mainly on the guiding body 11. This tensile force acts in the same direction and in addition to the weight force. In order to anchor the guiding body 11 and to absorb the acting forces, the guiding body 11 could be supported in the drawing tank using struts which are surrounded by the molten glass 5. Such support is very stable mechanically. However, it has been found that it might have adverse effects on the quality of the glass ribbon 3. In contrast thereto, the present disclosure generally contemplates that the guiding body 11 is suspended in a self-supporting manner along at least a central section of the nozzle opening 9. According to a further embodiment it may in particular be contemplated that a glass ribbon 3 is formed by the drawing, which has a central area of uniform thickness and two edge-side beads of greater thickness than that of the central area, and that the guiding body 11 is suspended in such a way that it extends in a self-supporting manner at least along the section of the nozzle opening along which the central area of uniform thickness is formed.

Figure 2:
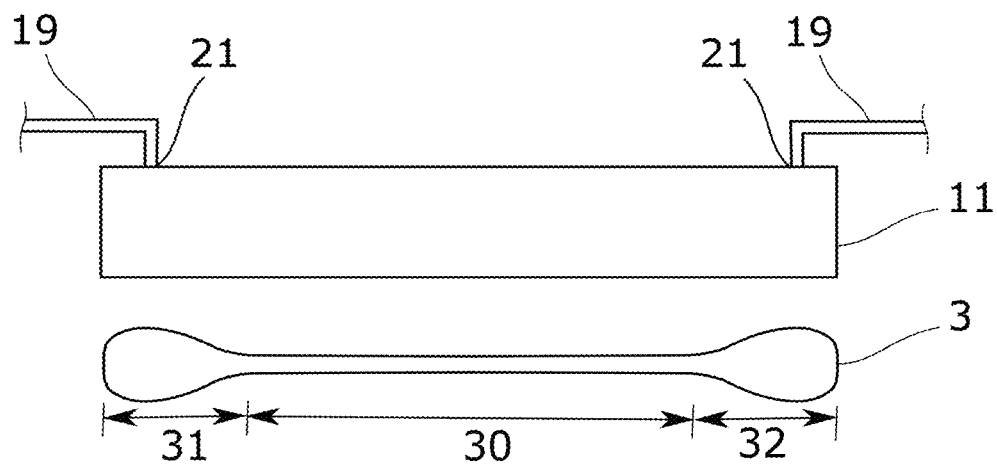
FIG. 2 shows a guiding body with suspension and a glass ribbon in cross section.
Figure 3:
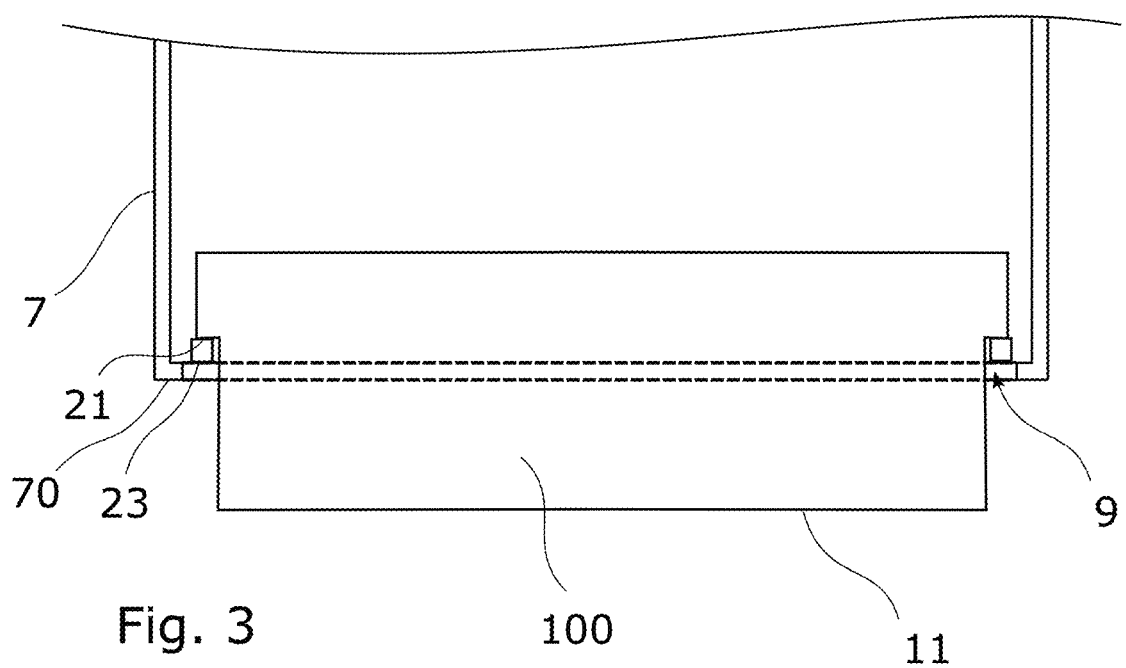
FIG. 3 is a longitudinal section through the drawing tank, with the section taken along the nozzle opening.

FIG. 2 shows a guiding body 11 with a suspension according to one embodiment and a glass ribbon 3 in cross section. The glass ribbon 3 comprises a central area 30 along which the thickness of the glass ribbon 3 does not vary at all or only slightly, and beads 31, 33 on the edges. The central area 30 is what is known as the quality area from which the glass products to be manufactured are produced. Typically, the beads 31, 33 are severed and the glass of the beads can be re-melted and returned into the drawing tank 7. The guiding body 11 is suspended on mounts 19. The supported areas 21 where the forces acting on the guiding body 11 are transferred to the mounts 19 are close enough to the lateral edge so that these areas are located outside the quality area or central area 30. Between these areas 21 the guiding body 11 is self-supporting, that is to say there are no further suspension points. FIG. 3 shows a specific implementation of this embodiment.

FIG. 3 is a schematic sectional view through the drawing tank with the cutting direction centered along the nozzle opening 9 with a vertical cutting plane. On the bottom 70 of drawing tank 7, where the nozzle opening is provided, support elements 23 are placed, upon which the guiding body 11 bears. Support elements 23 may be placed as shown, close to the nozzle opening 9, and span the nozzle opening 9. The supported points of the guiding body 11 on the support elements 23 form the bearing areas, in particular supported areas 21 of the guiding body 11.

According to one embodiment of the invention, without being limited to the example shown, it is generally contemplated that the guiding body 11 in the drawing nozzle rests on the support elements 23 and is held on these support elements 23 in a self-supporting manner between the supported areas 21.

In general, the guiding body 11 is preferably designed such that it does not bend significantly when the glass ribbon is drawn off from the drawing tank 7 with a tensile force of greater than 100 N per 1000 mm glass ribbon width.

Figure 4:
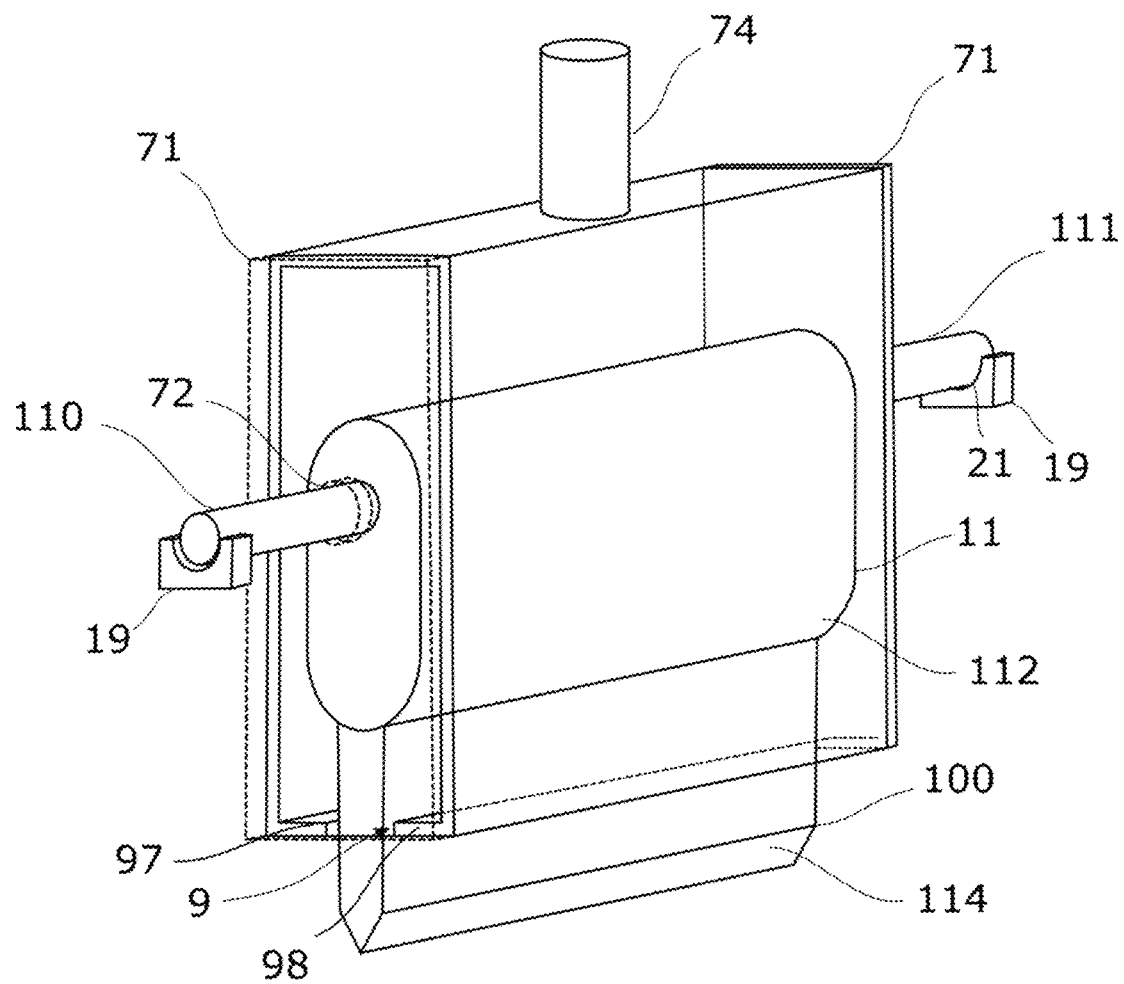
FIG. 4 is a perspective view of a drawing tank with a guiding body.

FIG. 4 schematically shows an example of a further particularly preferred embodiment. Here, the drawing tank 7 is shown in a perspective view. This view furthermore shows an inlet 74 through which the molten glass is introduced into the drawing tank 7. In this example, the drawing tank 7 is closed laterally by two end plates 71. End plates 71 have openings 72 through which cantilevers or cantilever arms 110, 111 of the guiding body 11 protrude. These cantilever arms 110, 111 rest on mounts 19 arranged outside the drawing tank 7. The supported areas 21, between which the guiding body 11 is suspended in a self-supporting manner are therefore located outside of the drawing tank 7 and thus also outside the molten glass flowing downward in the drawing tank 7. Without being limited to the example shown, it is therefore contemplated according to one embodiment of the apparatus for drawing glass ribbons that the guiding body 11 is supported outside the drawing tank 7. In this case, the guiding body in particular extends in a self-supporting manner across the entire interior of the drawing tank 7. In this way the glass flow is prevented from being affected by the mounts. This ensures consistent glass quality and prevents streaks from arising.

This arrangement also has another advantage. The mounts of the guiding body 11 are decoupled from the drawing tank 7 in this way, so that portions of the drawing tank can be replaced without removing the guiding body 11. This applies in particular to the nozzle slot or portions of the drawing tank 7 which define the nozzle slot 9. In the illustrated example, bottom plates 97, 98 can be replaced, or more generally portions of the wall comprising the bottom plates, without removing the guiding body 11. This allows to exchange the bottom plates so as to modify the width of the nozzle opening 9 without having to move the guiding body 11 during that exchange. Without being limited to the specific example of FIG. 4, it is therefore contemplated according to a further embodiment of the invention that the drawing tank is configured so that the portions of the drawing tank 7 defining the nozzle opening 9 can be replaced while the guiding body 11 remains in place on its mounts.

However, with self-supporting mounting of the guiding body 11, creep deformation may occur over time, particularly in the case of hot molten glass, under the influence of the weight force and the forces exerted by the drawing device 17. In order to reduce the creep effect the component incurs while being subjected to stress by high temperatures, intrinsic weight and the drawing force and in order to increase processing stability of the blade body and the nozzle material and hence to increase the service life of the apparatus 1, it is contemplated according to a preferred embodiment that the guiding body 11 comprises a fine grain stabilized metal.

Figure 5:
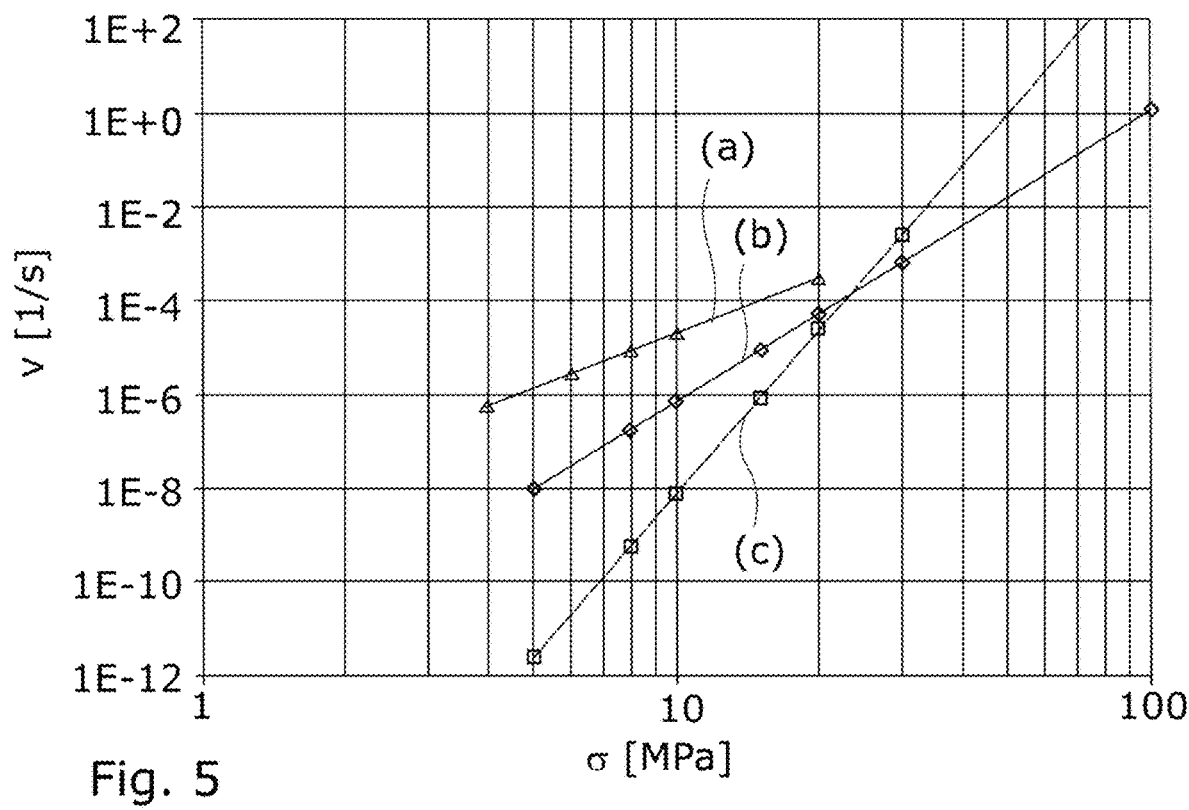
FIG. 5 is a graph showing measured values of the creep rate of several alloys as a function of mechanical tension.

In this regard, FIG. 5 shows a graph of measured values of creep rate v as a function of an applied mechanical tension σ for several alloys that are suitable for glass manufacturing. All readings were captured at a material temperature of 1400° C. Curve (a) shows the measured values for a conventional platinum-rhodium alloy which is not fine grain stabilized. Curves (b) and (c) represent measured values of two different fine grain stabilized alloys. At a mechanical stress of 5 MPa, the creep rate of the alloy represented by curve (b) is already two orders of magnitude below that of the not fine grain stabilized material. For the material represented by the measured values of curve (c), this is even more than 5 orders of magnitude, although the creep rate increases faster with increasing stress here than in the case of a not fine grain stabilized material. The properties of fine grain stabilized alloys can be influenced and adjusted through the amount, type, and size of the particles added for stabilization. In any case, the use of a fine grain stabilized alloy for the guiding body allows to process glasses with a forming temperature of more than 1100° C., even 1400° C. and more, as can be seen from FIG. 5.

Examples of fine grain stabilized metals include the materials marketed under the names PtRh10 FKS Rigilit, PtRh10 FKS Saeculit from Umicore, and PtRh10 DPH or DPH-A from Heraeus. In addition to the PtRh alloys on which the measured values of FIG. 5 are based, it is possible to use Pt, PtAu, PtRhAu and PtIr as the fine grain stabilized material. Generally, the stabilizing particles may consist of or comprise oxidic particles. For example $ZrO_2$ particles are suitable.

Highly creep-resistant precious metals such as pure iridium are not preferred as an alternative, since they are generally less resistant to oxidation. It is generally also possible to coat ceramics with stabilized or partially stabilized alloys in order to increase the creep resistance and to prevent corrosion of the ceramics.

According to one embodiment, the guiding body 11 is made entirely of fine grain stabilized material. Particularly high creep resistance at high temperatures is achieved in this way. However, this increases material costs. Also, portions made of fine grain stabilized alloys are not easily welded, since the stabilizing particles may float up, which can significantly reduce the stability in the welding zone. Furthermore, these stabilized metals are more brittle than non-stabilized materials, due to the particles contained in the microstructure.

According to another embodiment, it is therefore contemplated to provide a multi-piece guiding body 11 which comprises at least one component that is made of fine grain stabilized metal. A multi-piece configuration is advantageous with respect to the lower material costs, but service life is somewhat shorter. In this case, the guiding body may in particular comprise a sandwich structure made of fine grain stabilized metal and at least one further material. Creep deformation is particularly relevant in areas subjected to high tensile stress. According to a further embodiment it is therefore contemplated that the guiding body 11 consists of a plurality of pieces and a lower portion of the guiding body 11 is a portion made of fine grain stabilized material. The term "lower portion" refers to the position of the portion with the guiding body 11 in its installed state.

In the example of FIG. 4, the guiding body 11 comprises an upper portion 112 which is thicker here, and a lower portion 114 which includes the portion 100 of the guiding body 11 protruding out of the nozzle opening 9. This lower portion 114 is subjected to tensile stress due to the intrinsic weight of the guiding body 11 and the force exerted on the glass ribbon by the drawing device 17. As in the example of FIG. 1, portion 112 defines a resistance body 101 due to its thicker dimension. The lower portion 100 protruding out of the nozzle opening has the shape of a blade 103.

Several embodiments of the shape and structure of the guiding body 11 and nozzle opening 9 will now be explained in more detail. Generally, the shape of the tools can be optimized to improve their stability. Also, the pressure profile can be adjusted and the mixing of the molten glass can be improved.

If, for example, the guiding body 11 is in the form of a simple metal sheet of insufficient thickness inside the nozzle slot, then instabilities may result lengthways and crossways to the drawing direction under high load such as at more than 100 N per 1000 mm glass ribbon width and high temperature of 1200° C. and more. This will cause variations in the width of the nozzle slot and thus instabilities in the drawing process. Stability can be increased sufficiently by adapting the shape of guiding body 11.

Figure 6:
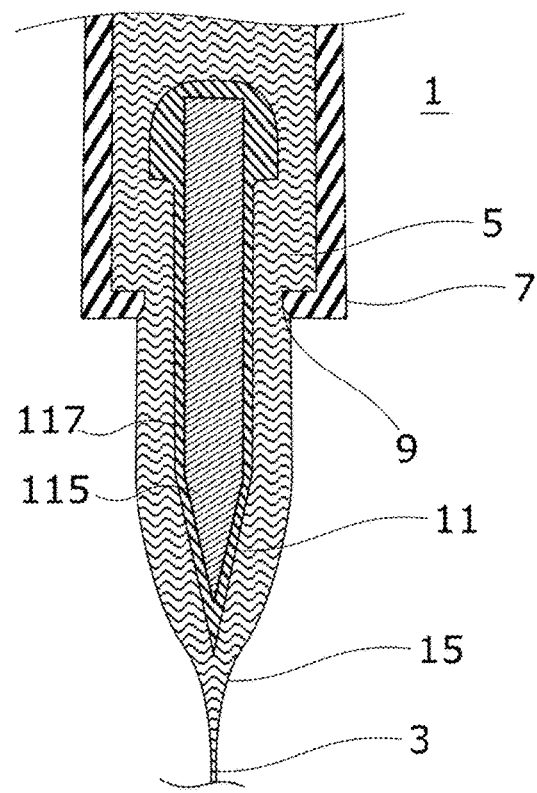
FIGS. 6 to 10 show devices with different embodiments of guiding bodies.

FIG. 6 shows an embodiment of an apparatus 1 for drawing glass ribbons 3 comprising a guiding body 11 that also has a thickened upper portion, as in the example shown in FIG. 4. This upper portion is mushroom-shaped in the example of FIG. 6. Furthermore, the example of FIG. 6 also shows a multi-piece guiding body 11. Here, however, the individual components are not placed on top of one another with a lower portion 114 being made of fine grain stabilized metal. Rather, the example of the guiding body 11 shown in FIG. 6 is configured as a sandwich structure. Generally, for this purpose, a guiding body 11 is provided which comprises an inner portion 115 that is surrounded by a lining 117, as in the example shown. The lining is preferably made of fine grain stabilized metal. This even allows to use materials for the inner portion 115 that would not be desirable or would be disadvantageous for glass contact. The guiding body 11 may thus comprise at least one ceramic element which is coated with the fine grain stabilized metal. In this case, the inner portion 115 is made of a ceramic material, and the lining 117 is made of fine grain stabilized metal.

Another option is to use a highly creep-resistant metal for the core or inner portion 115, which however is less suitable for contact with the molten glass 5. What comes into consideration here are the highly creep-resistant noble metals already mentioned, such as pure iridium. According to one embodiment, it is therefore suggested that the guiding body comprises an inner portion 115 made of iridium, which is surrounded by a lining 117. The lining 117 may then again comprise a fine grain stabilized metal, at least in areas subject to tensile stress.

The pressure conditions can be adjusted through the geometry of the system consisting of the nozzle slot and flow resistance inside the drawing tank. Flow resistance and static pressure together cause a desired overpressure at the end of the drawing tank, i.e. at the nozzle opening. This ensures homogeneous glass distribution on the blade body. The geometric design of flow resistance on the guiding body inside the drawing tank and the design of nozzle slot width (spacing between the slot nozzle and the guiding body at the drawing tank outlet) provide means to adjust the pressure drop so that the molten glass at the nozzle outlet barely widens, so that wetting of the underside of the nozzle slot edge is avoided.

Figure 7:
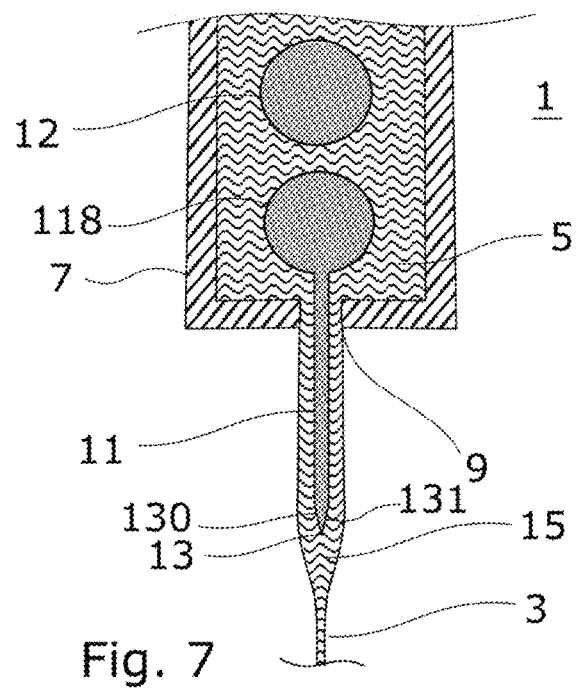

FIG. 7 shows an example of a further embodiment. In principle, this example is based on the fact that above the guiding body 11 that protrudes out of the nozzle opening 9, a further guiding body 12 is arranged inside the drawing tank 7 and spaced apart from this guiding body 11 that protrudes out of the nozzle opening 9, preferably likewise in a self-supporting manner. This further guiding body 12 serves to additionally mix the molten glass 5. However, such an additional guiding body 12 may in particular also be used to influence the flow resistance for the molten glass 5.

The setting of the nozzle slot width also has an influence on the size of the tear-off angle on the lower edge of the nozzle. If this angle is too small, wetting with glass may occur below the edge of the nozzle, which might result in crystallization and glass defects. Without being limited to the exemplary embodiments, it is therefore contemplated according to one embodiment of the invention that the pressure drop of the molten glass 5 in the drawing tank is adjusted such that wetting of areas on the underside of the drawing tank 7 adjacent to the nozzle opening 9 is avoided. In addition to the position and shape of the one or more guiding body/bodies, the pressure drop may also be adjusted through the temperature of the molten glass.

Another advantage of an internal flow resistance in the form of the guiding body 11, optionally also a further guiding body 12, in the drawing tank 7 is the reduced sensitivity of the glass quality (e.g. with respect to thickness variations) in the case of existing or arising service life-related tool deformations during long-term use (e.g. compensation of drawing tank bulges, lowering of the blade body, inclination of the blade body, etc.), since a kind of compensation volume is created below the internal flow resistance, where the glass mass is allowed to homogenize in terms of its transverse distribution before it flows through the nozzle slot (only for a thickness ratio of blade to flow resistance in the drawing tank of <1).

With the adjustments presently described, the service life of the tools can be increased by at least one order of magnitude, which translates into a stabilization of product quality and also cost savings. Furthermore, an increase in the width of the ribbon is made possible, since adaptations to the geometry and the use of stabilized alloys translate into less pronounced bending or creep deformation even under the then increased tensile loads. The mechanically stabilizing thickening of the guiding body 11 in the drawing tank 7 as implemented in the exemplary embodiments illustrated so far generally also contributes to the longer service life. Without being limited to the specific exemplary embodiments, it is therefore contemplated according to a further embodiment that the guiding body 11 has a greater thickness inside the drawing tank 7 than at the nozzle opening 9. In the example shown in FIG. 7, the thickening 118 that also defines a resistance body 101 has a cylindrical shape.

In order to avoid unstable flow patterns at the end of guiding body 11, a sharply tapering tear-off edge 13 at the lower end of guiding body 11 is advantageous, as is the case in the examples of FIGS. 1, 4, 6, and 7 illustrated so far. In other words, the tear-off edge 13 forms a cutting edge. The surfaces 130, 131 converging into the tear-off edge 13 may be flat, convex, or concave. In the example of FIG. 7, surfaces 130, 131 are flat.

Figure 8:
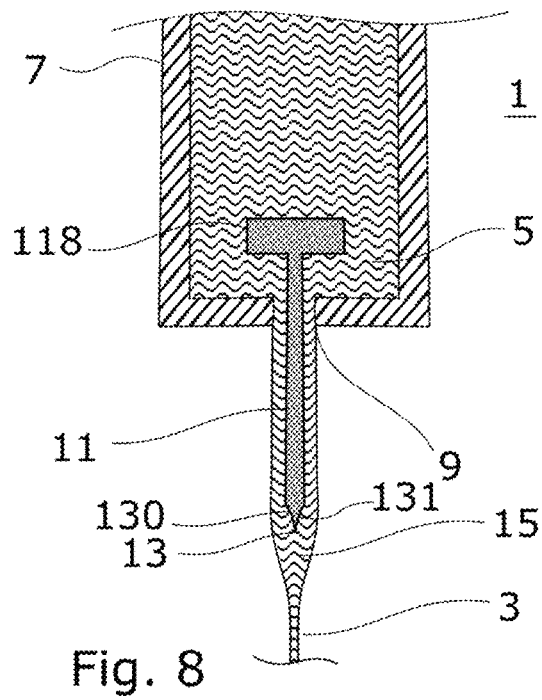

FIG. 8 shows an example of a guiding body which has a plate-shaped thickening 118, so that the upper end of guiding body 11 is T-shaped. The example furthermore shows surfaces 130, 131 converging into the tear-off edge 13, which are concavely shaped here.

Figure 9:
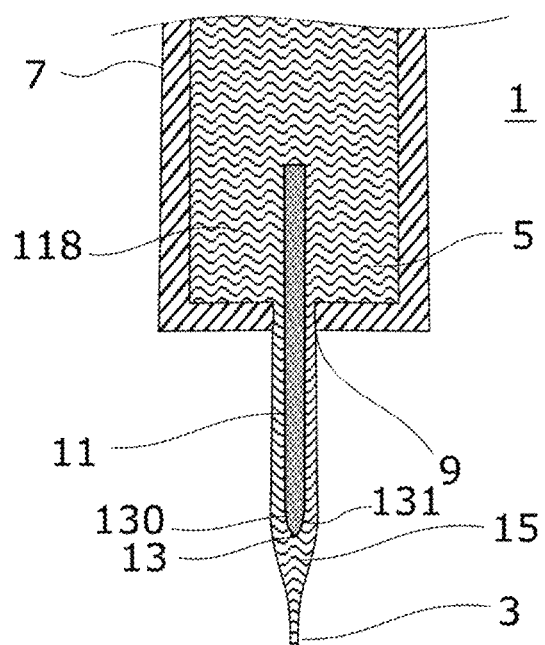

The thickening is advantageous for mechanical reasons, but is not mandatory. FIG. 9 shows an exemplary embodiment in which the guiding body 11 inside the drawing tank 7 is not enlarged compared to its thickness close to the nozzle slot. Rather, the guiding body 11 has the shape of a blade or plate here, with a substantially consistent thickness and with surfaces 130, 131 at a cutting edge converging into a tear-off edge 13 at its lower end. This embodiment has the advantage, inter alia, that the guiding body 11 can be easily removed from the nozzle opening 9, provided it is suitably suspended. Without being limited to the illustrated examples and also regardless of whether the guiding body 11 has a thickening 118 or not, at least the portion of the guiding body 11 that extends through the nozzle opening 9 preferably has a thickness in a range from 0.5 mm to 20 mm.

Figure 10:
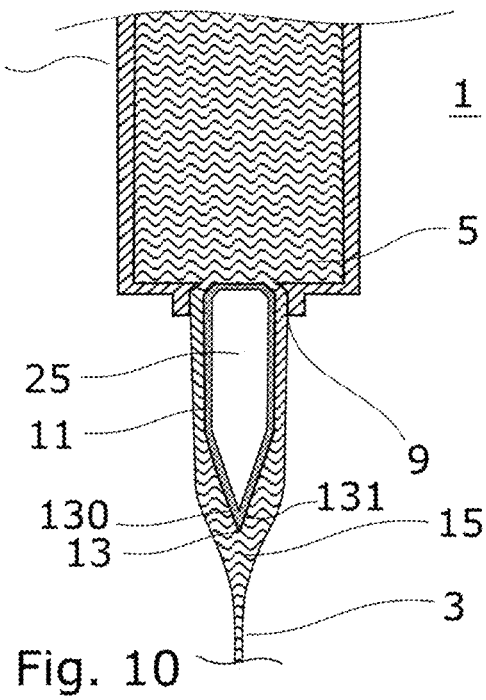

Furthermore, it is not necessary in all embodiments of the apparatus that the guiding body 11 extends into the interior of the drawing tank 7. Rather, the upper end thereof may as well be located inside the nozzle opening 9. Such an embodiment is shown in FIG. 10. Here, again, the advantage is that the guiding body 11 can be replaced easily, optionally even during operation. However, flow resistance is essentially only limited by the remaining gap width of the nozzle opening 9 here. In particular if a thicker guiding body is used, as shown in the example of FIG. 10, the guiding body 11 may at least partially be hollow, alternatively or in addition to a sandwich structure. This option is shown in the example of FIG. 10. Accordingly, the guiding body 11 has a cavity 25. If the guiding body 11 is formed from metal sheets that enclose a cavity 25, this has the advantage of a comparatively low intrinsic weight.

Figure 11:
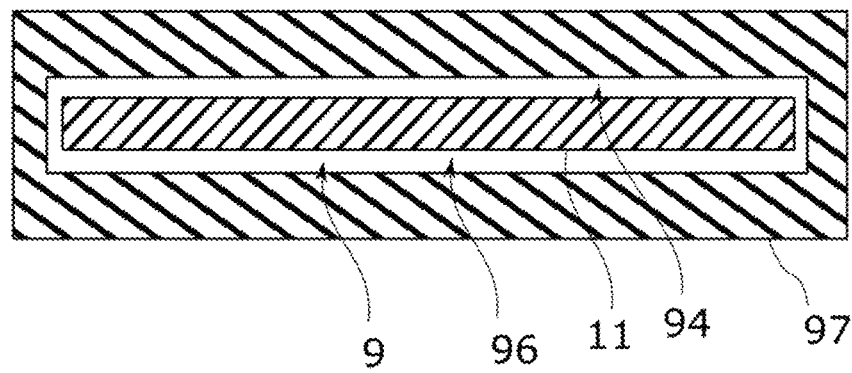
FIGS. 11 and 12 show embodiments of nozzle openings.

As shown in the plan view of FIG. 11, the nozzle opening 9 may have the shape of a slot-like opening in a bottom panel, which is in particular closed laterally. The guiding body 11 is then held in the center, preferably without contacting the edges of the opening, as shown, so that nozzle slots 94, 96 are defined. The width thereof is determined by the width of the nozzle opening 9 and the thickness of the guiding body 11.

Figure 12:
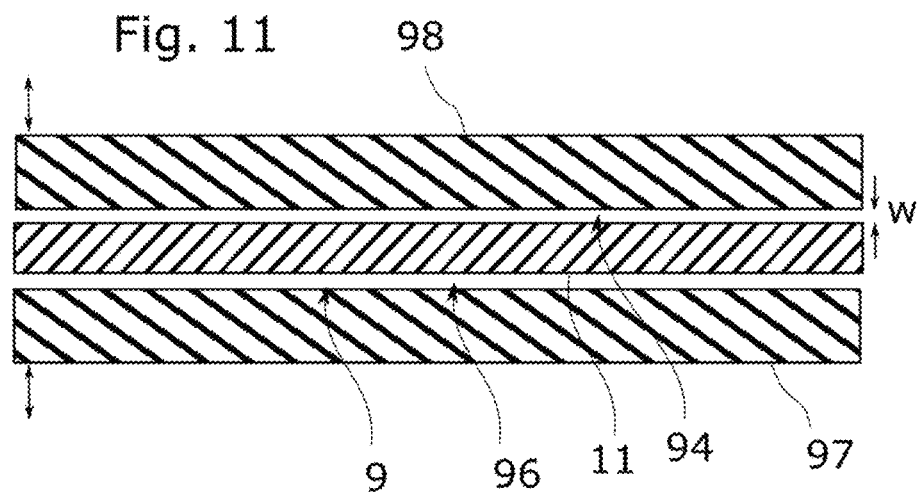

In the embodiment shown in FIG. 12, a two-part nozzle ledge is provided, with adjustable width w of the nozzle slots 94, 96. For this purpose, the bottom plates 97, 98 are configured to be movable so that they can be displaced perpendicular to the longitudinal extension of the slot-shaped nozzle opening 9. The displacement direction is illustrated by the double arrows indicated on the bottom plates. More generally, without being limited to the illustrated example, the drawing tank may comprise movable bottom plates 97, 98 for adjusting the spacing between the plates and the guiding body 11 and thus for adjusting the width of nozzle slots 94, 96. Accordingly, the method for producing a glass ribbon 3 may also include the step of adjusting the width of the nozzle slots 94, 96. This adjustment may be applied, for example, in order to control the throughput and/or the thickness of the glass ribbon. In one embodiment, the nozzle slot width, i.e. the width of these nozzle slots is in a range from 4 mm to 15 mm, most preferably in a range from 6 mm to 10 mm.

Another possibility for adjusting or controlling the thickness of the glass ribbon is by adjusting the temperature of the molten glass. In this respect, a particular further advantage is obtained by suspending the guiding body 11 in a self-supporting manner across the drawing tank. It is possible in this case to feed an electric current through the mounts 19 of the guiding body or through separate connections so as to conductively heat the guiding body directly. In this case, the current will flow through the guiding body 11 perpendicular to the drawing direction of the glass ribbon and also to the flowing direction of the molten glass 5. In the example shown in FIG. 4, the current would therefore be injected from a mount 19 through the cantilever arm 110 supported in the mount and into the guiding body 11 and would be directed out of the guiding body 11 through the opposite cantilever arm 111 and the associated mount 19.

Figure 13:
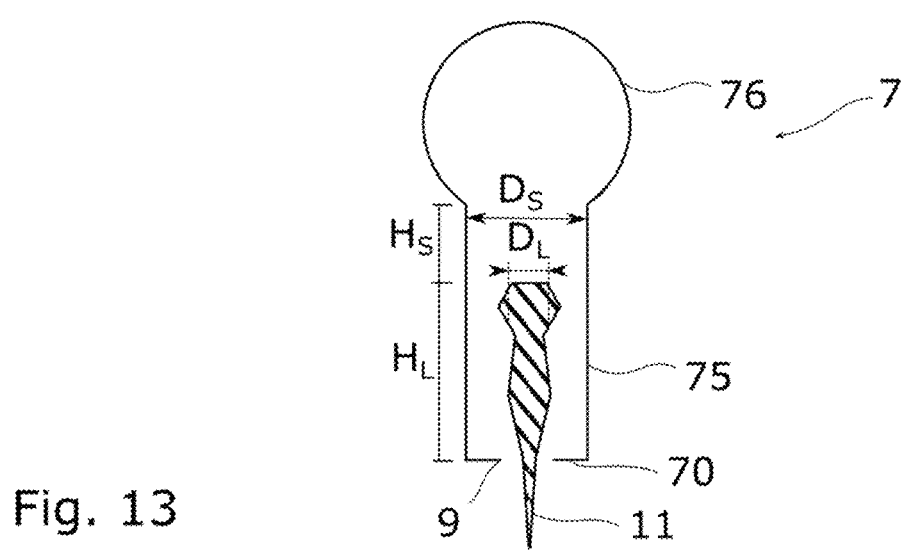
FIG. 13 is a cross-sectional view of a drawing tank for illustrating parameters for calculating the pressure drop in the drawing tank.

According to a further embodiment of the invention, the pressure drop in the drawing tank is adjusted in a specific way in order to improve the shape accuracy and dimensional consistency of the glass ribbon. This adjustment prevents a negative pressure from developing in the drawing tank. Such negative pressure might mechanically deform the drawing tank, which may also affect the glass thickness. Moreover, a local negative pressure may cause an unstable flow pattern of the molten glass in the drawing tank, which may also result in an inhomogeneous glass thickness or in glass defects. The adjustment according to this embodiment will now be explained in more detail with reference to the schematic sectional view of the drawing tank 7 in FIG. 13. This figure shows a cross-sectional view of a drawing tank 7 indicating dimensions which are used to calculate the pressure drop in the drawing tank.

Similar to the example in FIG. 1, the upper portion of the drawing tank 7 is formed by a tubular section or manifold pipe 76 that opens into a chamber 75 which extends down to the bottom 70 of the drawing tank 7. Chamber 75 has a smaller cross section than the manifold pipe 76. Accordingly, the width $D_A$ of the chamber 75 is smaller than the diameter of the manifold pipe 76. Due to the small cross section, pressure changes will primarily occur along the chamber 75. Particular contributions come from the sections in which the guiding body 11 or guiding bodies further narrow the chamber. According to one embodiment, the temperature in the drawing tank is adjusted such that the following condition is met:

$$48 \frac{\dot{v}}{B} \int_{H_L} \frac{\eta}{(D_S - D_L)^3} dz + 12 \frac{\dot{v}}{B} \int_{H_S} \frac{\eta}{D_S^3} dz > \rho \cdot g \cdot h - p_u$$

In the above relationship, $\dot{v}$ is the volume flow of the molten glass, B is the width of the drawing tank 7 in the direction along the nozzle opening or along the glass ribbon perpendicular to the drawing direction, $\eta$ is the viscosity of the molten glass, $D_S$ is the local width of chamber 75, $D_L$ is the local thickness of guiding body 11, $\rho$ is the density of the molten glass, g is the gravitational acceleration, and h is the height of chamber 75. The integration is made over sections $H_L$ and $H_S$ in the vertical direction z. The integration may also be made over two or more sub-sections, in which case the sub-integrals then having to be added. This is the case if a plurality of guiding bodies are provided, which are separated apart from one another in the vertical direction, as in the example of FIG. 7.

The symbol $p_u$ denotes a pressure magnitude of 2000 Pa. This magnitude accounts for a negative pressure that is still tolerable. Thus, the right side of the relationship represents the hydrostatic pressure of the molten glass reduced by the still tolerable negative pressure $p_u$. This term is a constant. The prefactor $\dot{v}/B$ defines the thickness of the glass ribbon which is predetermined so that the prefactor also represents a constant. On the other hand, what can be controlled through the temperature for a given thickness of the glass ribbon is the strongly temperature-dependent viscosity $\eta$. The temperature may also be controlled differently locally. Also, the temperature in the drawing tank may vary along the vertical direction. Thus, the viscosity may be location-dependent, $\eta = \eta(z)$. This dependency can accordingly also be taken into account in the integration.

It is thus contemplated according to one embodiment that the drawing tank 7 comprises a chamber 75 in which the guiding body 11 is arranged and which has the nozzle opening 9 at its lower end, and that the temperature of the molten glass 5 in the drawing tank 7 is adjusted such that the relationship given above is fulfilled with the temperature-dependent viscosity thereof.

It will be apparent to a person skilled in the art that the invention is not limited to the specific exemplary embodiments illustrated in the figures, but may be varied in many ways. Different embodiments may in particular also be combined with one another.

LIST OF REFERENCE NUMERALS

1 Apparatus
3 Glass ribbon
5 Molten glass
7 Drawing tank
9 Nozzle opening
11, 12 Guiding body
13 Tear-off edge
15 Drawing onion
17 Drawing device
19 Mount
21 Supported area
23 Support element
25 Cavity
30 Central area of 3
31, 32 Beads of 3
50, 52 Substreams of 5
70 Bottom of 7
71 Lateral end plates
72 Opening in 71
74 Inlet to 7
75 Chamber
76 Manifold pipe
90, 92 Edges
94, 96 Nozzle slots
97, 98 Bottom plates
100 Protruding portion of guide body
191 Resistance body
103 Blade
110, 111 Cantilever arm
112 Upper portion
114 Lower portion
115 Inner portion
117 Lining
118 Thickening
130, 131 Surfaces converging at tear-off edge

What is claimed is:
1. A method for producing a glass ribbon, comprising:
suspending a guiding body via a mount so that the guiding body is self-supporting at least along a section of a nozzle opening over which a central area of the glass ribbon is formed, the central area having a uniform thickness that is less than a thickness of two edge-side beads of the glass ribbon, wherein the guiding body is at least partially mounted inside a drawing tank, wherein the guiding body comprises a resistance body arranged inside the drawing tank and a blade arranged below the resistance body, wherein the resistance body has a width that is greater than a width of the blade, wherein the drawing tank has portions that define the nozzle opening, and wherein the mount of the guiding body is located above the nozzle opening and the portions are removable while the guiding body remains on the mount;

feeding a molten glass to the drawing tank;

causing the molten glass to exit the drawing tank from the nozzle opening of the drawing tank in two substreams so that the molten glass runs along a portion of the guiding body protruding out of the nozzle opening;

combining the two substreams at a lower end of the guiding body to form a drawing onion;

drawing the glass ribbon off the drawing onion, wherein the step of drawing of the glass ribbon exerts a tensile force on the guiding body; and absorbing the tensile force with the mount of the guiding body.

2. The method of claim 1, wherein the step of drawing the glass ribbon further comprises controlling a temperature of the molten glass to a forming temperature of more than 1100° C.

3. The method of claim 1, further comprising supplying electric current through the mounts to directly conductively heat the guiding body.

4. The method of claim 1, wherein the tensile force is absorbed at lateral ends of the guiding body.

5. A method for producing a glass ribbon, comprising:

feeding a molten glass to a drawing tank;

adjusting a temperature of the molten glass in the drawing tank so that for a temperature-dependent viscosity n thereof the following relationship applies:

$$48 \frac{\dot{v}}{B} \int_{H_L} \frac{\eta}{(D_S - D_L)^3} dz + 12 \frac{\dot{v}}{B} \int_{H_S} \frac{\eta}{D_S^3} dz > \rho \cdot g \cdot h - p_u$$

wherein $\dot{v}$ is a volume flow of the molten glass, B is a width of the drawing tank in a direction along the nozzle opening, $D_S$ is a local width of the drawing tank, $D_L$ is a local thickness of the guiding body, $\rho$ is a density of the molten glass, g is a gravitational acceleration, h is a height of the drawing tank, and $p_u$ is a pressure of 2000 Pa;

causing the molten glass to exit the drawing tank from a lower nozzle opening of the drawing tank in two substreams so that the molten glass runs along a portion of a guiding body protruding out of the lower nozzle opening;

combining the two substreams at a lower end of the guiding body to form a drawing onion;

drawing the glass ribbon off the drawing onion, wherein the step of drawing of the glass ribbon exerts a tensile force on the guiding body; and absorbing the tensile force with a mount of the guiding body.

* * * * *